United States Patent [19]

Iwasaki et al.

[11] 4,444,156
[45] Apr. 24, 1984

[54] WATER HEATER

[75] Inventors: Yasutaka Iwasaki, Nishinomiya; Mitsuru Tanaka, Neyagawa; Akihiko Yasuda, Higashiosaka; Munetaka Kinugasa, Nara; Toshihiko Kikuchi, Nagaokakyo; Masao Maruyama, Toyonaka, all of Japan

[73] Assignee: Kabushiki Kaisha Youei Seisakusho, Higashiosaka, Japan

[21] Appl. No.: 448,276

[22] Filed: Dec. 9, 1982

Related U.S. Application Data

[63] Continuation of Ser. No. 266,145, May 22, 1981, abandoned.

[30] Foreign Application Priority Data

May 28, 1980 [JP] Japan .................................. 55-71730
May 28, 1980 [JP] Japan .................................. 55-71731
Oct. 7, 1980 [JP] Japan ........................... 55-143750[U]

[51] Int. Cl.³ .......................... F22D 1/00; B01D 53/34
[52] U.S. Cl. .................................. 122/20 B; 110/203; 237/55; 165/DIG. 2; 422/178
[58] Field of Search ...................... 110/203; 122/20 B; 237/55; 165/DIG. 2; 422/178

[56] References Cited

U.S. PATENT DOCUMENTS

| 2,521,462 | 9/1950 | Kinzelmann | 122/20 B |
|---|---|---|---|
| 3,944,136 | 3/1976 | Huie | 165/DIG. 2 |
| 4,079,885 | 3/1978 | Decker | 237/55 |
| 4,090,474 | 5/1978 | Kauffmann | 122/20 B |
| 4,136,731 | 1/1979 | DeBoer | 122/20 B |
| 4,194,488 | 3/1980 | Belloff | 237/55 |
| 4,227,647 | 10/1980 | Eriksson | 122/20 B |
| 4,289,730 | 9/1981 | Tomlinson | 110/203 |
| 4,303,198 | 12/1981 | Dulac | 110/203 |
| 4,309,947 | 1/1982 | Ketterer | 110/203 |

FOREIGN PATENT DOCUMENTS 2634603 2/1977 Fed. Rep. of Germany .

OTHER PUBLICATIONS

The Condensed Chemical Dictionary, 8th Edition, Revised by Gesmer G. Hawley, pp. 517, 533.

Primary Examiner—Henry C. Yuen
Attorney, Agent, or Firm—Cushman, Darby & Cushman

[57] ABSTRACT

A water heater of the combustion type having a collecting assembly for collecting the drain water resulting from combustion to prevent corrosion of components of the heater by the drain water.

1 Claim, 5 Drawing Figures

WATER HEATER

This is a continuation, of application Ser. No. 266,145, filed May 22, 1981, abandoned.

BACKGROUND OF THE INVENTION

1. Field of the Invention

The present invention relates to a water heater, and more particularly to a water heater of the combustion type in which a heat exchanger is heated by a burner.

2. Description of the Prior Art

When it is attempted to improve the thermal efficiency of a water heater with use of a main heat exchanger having an increased area of heat transfer per unit output or an additional heat exchanger of the waste heat recovery type, the water vapor resulting from combustion condenses on the main or additional heat exchanger to produce a large amount of drain water during the use of the water heater. Since the drain water has dissolved therein $SO_x$, $NO_x$, etc. contained in the combustion gas, the water has a high acidity of about 2 to about 5 in pH and is therefore liable to cause corrosion to the burner and neighboring members. To overcome this drawback, heat exchangers for conventional water heaters are designed to have such a capacity that the exchanger will not release highly acidic drain water or will produce only a very small amount of drain water. Use of such heat exchangers entails the drawback of low thermal efficiency.

SUMMARY OF THE INVENTION

In view of the above situation, an object of the present invention is to provide a water heater which has an improved thermal efficiency to assure savings in fuel or heat energy and which gives, as a secondary effect, enhanced thermal durability to the exhaust system therefor due to a reduction in the temperature of the exhaust gas.

To fulfill this object, the invention provides a water heater comprising a heat exchanger, a burner for heating the heat exchanger and an assembly for collecting the drain water released from the heat exchanger.

Thus the collecting assembly is adapted to collect the highly acidic drain water resulting from the combustion of fuel during the use of the water heater, so that the burner and other components will not be exposed to a large quantity of highly acidic drain water and can be protected from corrosion. This makes it possible to provide a water heater of improved thermal efficiency with use of a heat exchanger which has an increased area of heat transfer per unit output and which produces a large amount of drain water.

Another object of the invention is to prevent corrosion of the drain pipe, kitchen drain channel, etc. for discharging the highly acidic drain water collected by the collecting assembly.

To fulfill the second object, the water heater of the invention is characterized in that the heater has a neutralizing unit for neutralizing the acidity of the drain water collected by the collecting assembly.

Thus the highly acidic drain water produced during the use of the water heater is collected, then adjusted to a pH of about 5 to about 9, i.e. approximately to neutrality, and thereafter drawn off. This permits use of a heat exchanger of increased capacity or an additional heat exchanger of the waste heat recovery type to give a fully improved thermal efficiency to the water heater in its entirety and consequently assure savings in energy. The present invention therefore makes it possible to commercially provide a water heater which achieves the highest thermal efficiency ever contemplated.

Other objects and advantages of the invention will become apparent from the following description.

DESCRIPTION OF THE PREFERRED EMBODIMENTS

Figure 1:
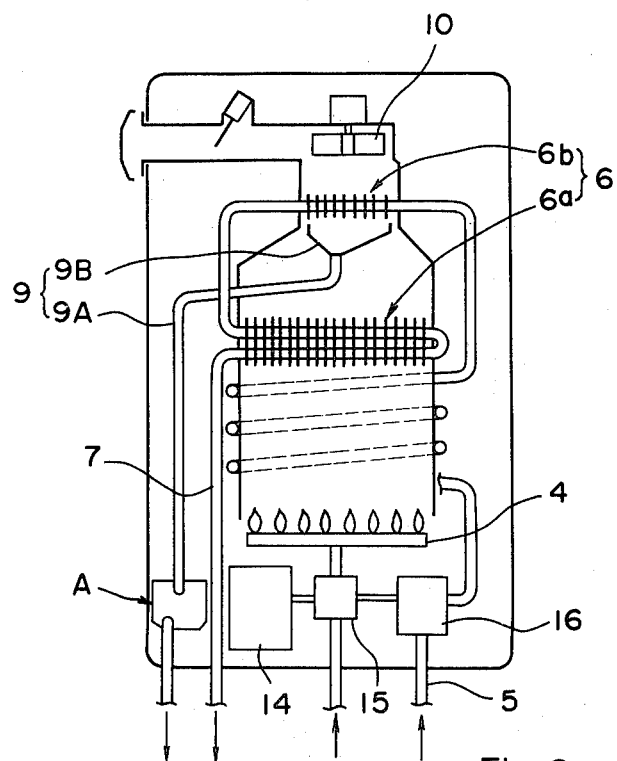
FIG. 1 is a diagram showing the construction of a water heater embodying the invention.

FIG. 1 shows a main heat exchanger 6a of the finned tube type disposed above a gas burner 4 and communicating at its opposite ends with a water supply pipe 5 and a hot water discharge pipe 7. Above the main heat exchanger 6a there is provided a finned tube heat exchanger 6b of the waste heat recovery type for preheating with waste heat the water to be heated. These heat exchangers 6a and 6b constitute a heat exchanger unit 6. Disposed below the heat exchanger 6b of the waste heat recovery type is a drain collecting assembly 9 comprising a collecting portion 9B for receiving highly acidic drain water produced on the exchanger 6b and a discharge channel 9A for drawing off the collected drain water. A fan 10 is provided above the heat exchanger 6b for forcedly drawing off the exhaust gas at an increased velocity to thereby reduce the film resistance to heat transfer and also achieve an improved waste heat recovery efficiency. These components provide the main arrangement of a water heater. The waste heat recovering heat exchanger 6b comprises a copper tube and copper fins which are provided with an acid resistant surface coating formed by tin or nickel plating or dipping. The discharge channel 9A of the drain collecting assembly 9 has incorporated therein a neutralizing unit A for neutralizing highly acidic drain water. FIG. 1 further shows a burner controller 14, a gas valve 15 and a water valve 16.

Figure 3:
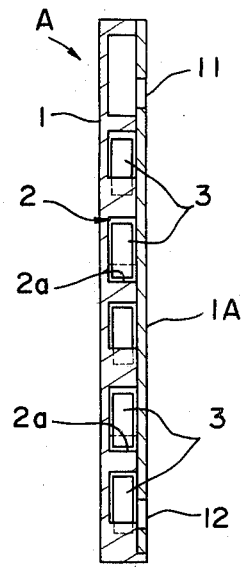
FIG. 3 is a view in vertical section taken along the line III—III in FIG. 2.
Figure 2:
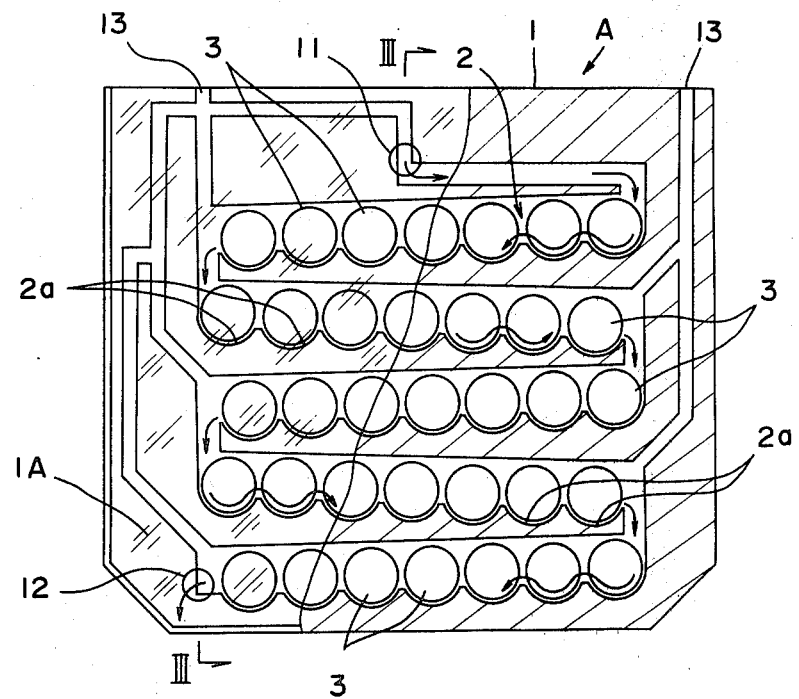
FIG. 2 is a fragmentary enlarged front view partly broken away.

As seen in FIGS. 2 and 3, the neutralizing unit A comprises a box-shaped case 1 having an open front side and molded from a resin material, such as vinyl chloride, which is resistant to corrosion and acid. The case 1 has in its interior a drain channel 2 formed when the case is molded, extending downward in a zigzag form and including slightly downwardly inclined channel sections. A multiplicity of solid pieces 3, circular when seen from the front and made of a neutralizing material such as metallic magnesium, are arranged side by side in close proximity to, or partially in contact with, one another in the zigzag drain channel 2 along the direction of flow of the drain therethrough, so that the drain will flow repeatedly in undulation along semicircular arc channel segments 2a which are formed along the outer peripheral lower surfaces of the neutralizing solid pieces 3. These pieces are replaceably fixedly retained in the interior of the case 1 by a detachable transparent front side cover 1A. FIGS. 2 and 3 also show a drain inlet 11, an outlet 12 for the neutralized drain and air vents 13.

Examples of useful solid neutralizing materials other than metallic magnesium are particulate aluminum metal, powdery $CaCO_3$, $Na_2CO_3$, $K_2CO_3$ and like inorganic compounds, cement, etc. Although not shown, a pH adjusting liquid agent may be added to the drain, or the collecting portion 9B may be provided with a magnesium alloy, stainless steel or other alkaline metal dish for neutralizing the drain on dripping.

The neutralizing solid pieces 3, which are in the form of a solid cylinder, may be of any other shape.

Figure 4:
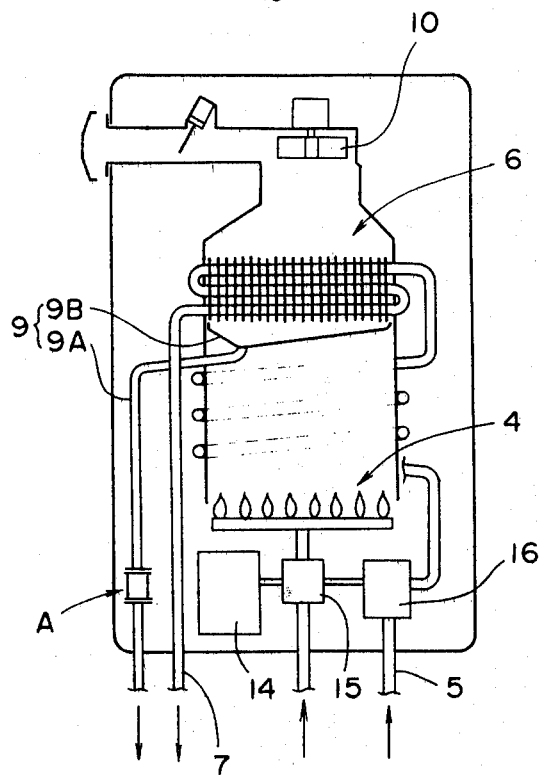
FIG. 4 is an overall view in vertical section schematically showing another water heater embodying the invention.

When the heat exchanger unit 6 consists only of the main heat exchanger 6a as shown in FIG. 4, the collecting portion 9B of the drain collecting assembly 9 is disposed below the exchanger 6a.

Figure 5:
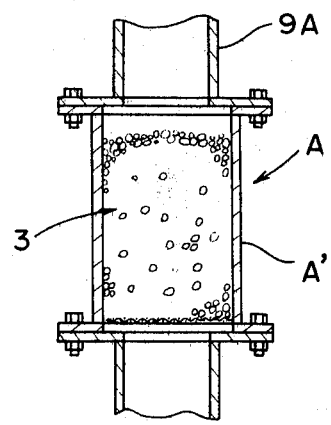
FIG. 5 is a fragmentary enlarged view of FIG. 4 in vertical section.

Further as shown in FIG. 5, the neutralizing unit A may comprise a tubular container A' which can be connected to the discharge channel 9A with flanges and a powdery neutralizing material 3 filled in the container A' for passing the drain water therethrough.

It is preferable that the water heater of FIG. 1 be so constructed that the drain collecting portion 9B will not impede the flow of hot combustion gas. For this purpose, the heat exchanger 6a or 6b is inclined in its entirety forward or backward so that one of the lower front and rear corners of each of the fins thereon will be positioned at a lower level than the other lower corner, causing the drain to collect toward the lower corner and to be received by the portion 9B provided therebelow. Alternatively the collecting portion 9B may be formed with a multiplicity of channels for passing the hot combustion gas to flow upward therethrough.

We claim:

1. A water heater comprising:
a heat exchanger through which water is passed;
a burner for generating hot combustion gases;
means for directing the hot gases over said exchanger to heat the water therein whereby acidic condensate is formed on said exchanger;
means for collecting the acidic condensate on said exchanger; and
drain means connected to said collecting means;
characterized in that:
an acid neutralizing unit is connected into said drain means and comprises a box-shaped case having therein drain channel means, including a plurality of downwardly inclined drain courses series connected in zigzag form with a gentle slope for each course, the lower surface of each of said courses being provided with a plurality of arc-like recesses with the axes thereof extending transversely of the corresponding course, said box-shaped case being formed of plastic material and including a cover of transparent material forming a side wall of each of said courses, and a solid piece of acid-neutralizing magnesium in each of said recesses.

* * * * *